Jan. 9, 1934.　　　A. H. KINZEL　　　1,943,122
GASKET
Filed Nov. 3, 1931　　　2 Sheets-Sheet 1

INVENTOR
ARCH H. KINZEL

BY

ATTORNEYS

Jan. 9, 1934.  A. H. KINZEL  1,943,122
GASKET
Filed Nov. 3, 1931  2 Sheets-Sheet 2

INVENTOR
ARCH H. KINZEL
BY
Ely & Barrow
ATTORNEYS

Patented Jan. 9, 1934

1,943,122

UNITED STATES PATENT OFFICE 1,943,122

GASKET

Arch H. Kinzel, Akron, Ohio

Application November 3, 1931. Serial No. 572,752

5 Claims. (Cl. 288—1)

This invention relates to gaskets.

The general purpose of the invention is to provide an improved resilient gasket construction of metal sheathed packing material.

Another purpose of the invention is to provide means associated with such a gasket construction for centering a comparatively narrow gasket in a comparatively wide joint.

The foregoing and other purposes of the invention are attained in the gasket construction illustrated in the accompanying drawings and described below. It is to be understood that the invention is not limited to the specific form thereof shown and described.

Of the accompanying drawings.

Figure 1:
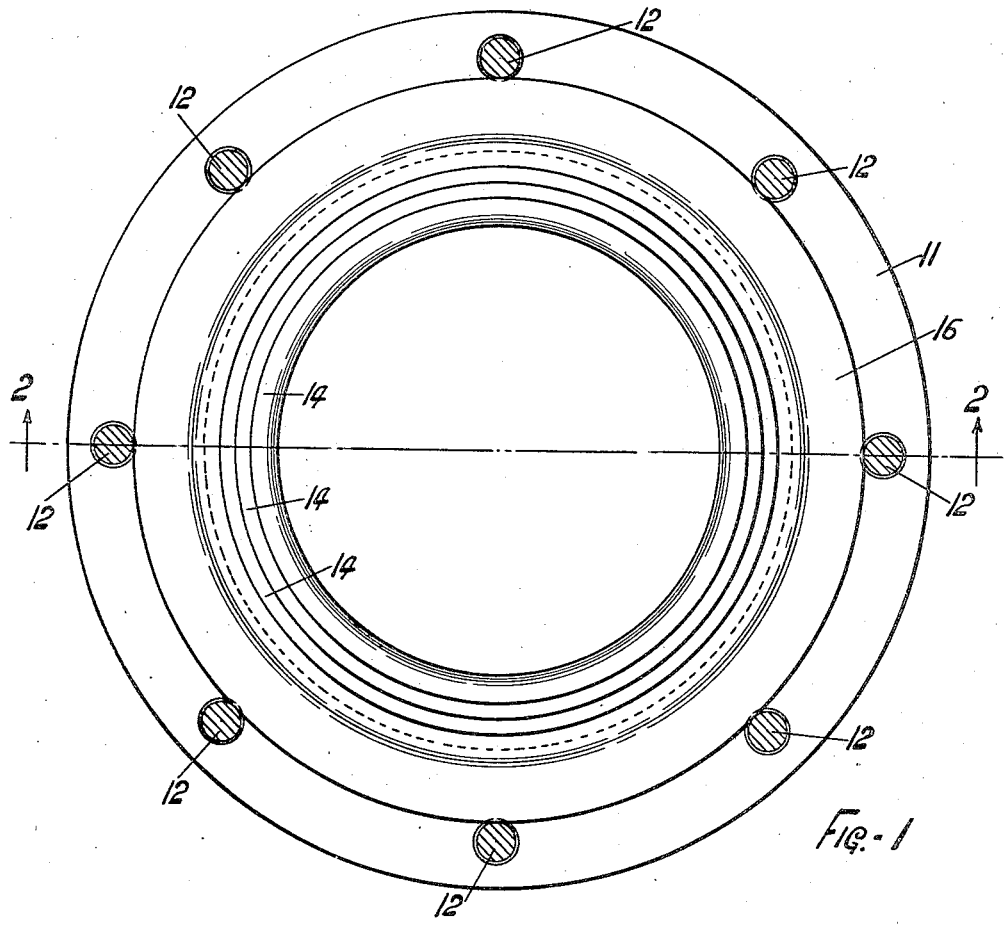
Figure 1 is a sectional plan on line 1—1 of Figure 2 through a joint having one form of the improved gasket therein.
Figure 2:
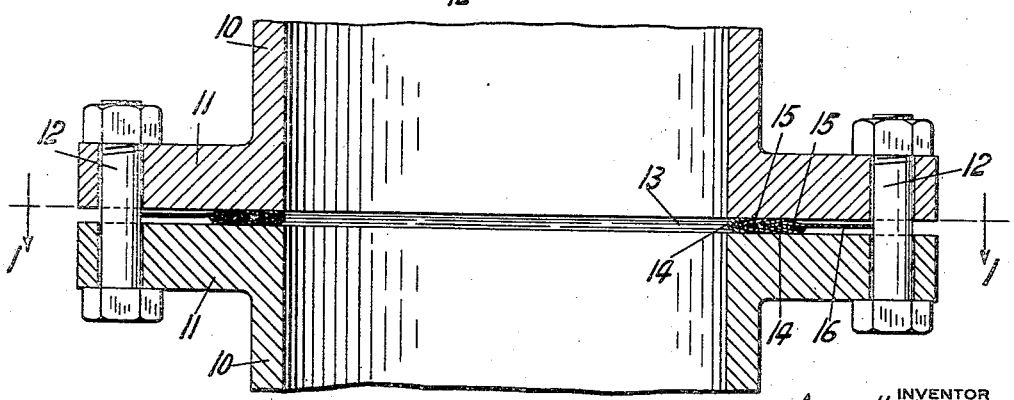
Figure 2 is a section on line 2—2 of Figure 1.

Referring to Figures 1 and 2 of the drawings, the numerals 10, 10 indicate tubes having flanges 11, 11 on adjacent ends thereof adapted to be secured together by bolts 12, 12. Between the flanges 11, 11 there is arranged a gasket 13. This gasket comprises a series of concentric rings 14, 14 of metal such as copper, Monel metal, etc., substantially of U-shape in radial section with the rings nested so that the flanges of one ring embrace the vertices of an adjacent ring and with soft, resilient packing material such as asbestos or the like 15, 15 enclosed by the metal in the spaces between the rings. The outermost ring 15 may have an extended flange 16 so as to center the comparatively narrow gasket shown in the joint by engagement with bolts 12.

Figure 3:
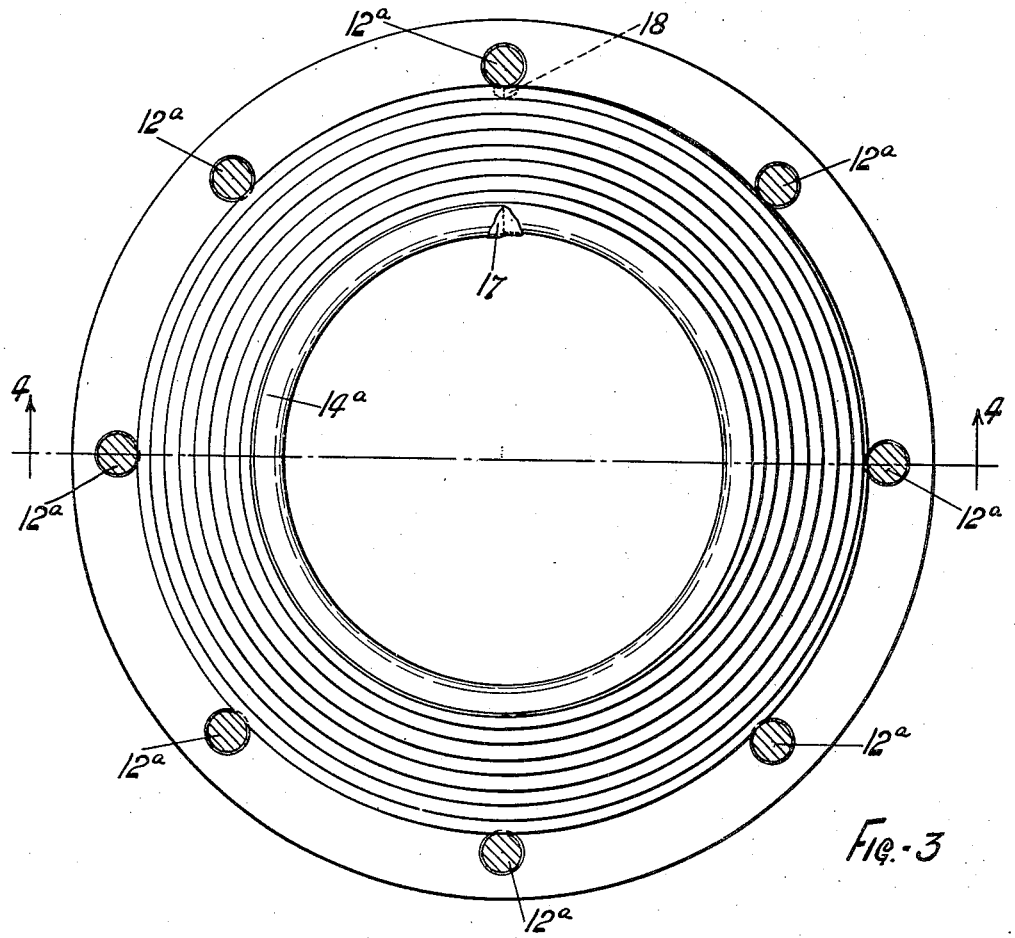
Figure 3 is a sectional plan on line 3—3 of Figure 4 through a joint having another form of the improved gasket therein.
Figure 4:
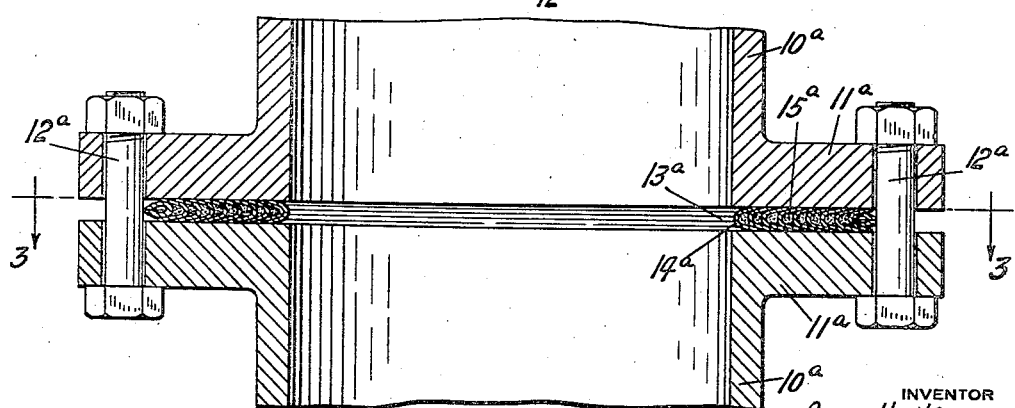
Figure 4 is a section on line 4—4 of Figure 3.

In Figures 3 and 4 there are shown similar tubes 10ª, 10ª provided with flanges 11ª, 11ª adapted to be bolted together by bolts 12ª, 12ª with a gasket 13ª embodying the invention compressed between the flanges. This gasket comprises a strip 14ª of comparatively stiff, resilient metal such as copper, Monel metal, etc., substantially of U-shape in section and wound in spiral convolution with the vertex portion of the strip in one convolution nested between the flanges of the strip in an adjacent convolution and with packing material such as asbestos 15ª enclosed by the metal in the spaces between the convolutions. The inner end of the strip may be secured as by welding or soldering to the adjacent convolutions as at 17 (Figure 3) and the outer end of the strip may be similarly secured to its adjacent convolutions as at 18.

The improved gasket constructions are capable of economical manufacture and since the soft packing material is completely enclosed by metal they are capable of repeated reuse. In gaskets of this type as heretofore constructed the soft packing has been exposed at the faces of the gaskets and when a joint is broken after these have been installed sometimes the soft packing loosens from the gasket and drops out or adheres to the flanges. This renders such gaskets useless.

The provision of the centering flange on a gasket positions a narrow gasket so that its inner periphery is aligned with the bore of the tubes. This prevents building up of deposits of chemicals, from solutions passed through such tubes, in the space between the joint. Such deposits, it has been found, are a frequent cause of joint failure. In steam lines this construction prevents formation of eddy currents and collection of condensate at the joints. The centering flange construction is especially valuable when used with the Van Stone type flange.

Modifications of the invention may be resorted to without departing from the spirit thereof or the scope of the appended claims.

What is claimed is:—

1. A gasket comprising a series of lengths of comparatively stiff, resilient sheet metal substantially U-shape in section embracing one another with the lengths in nested relation, and soft, resilient packing material between said lengths and entirely enclosed thereby in the spaces between the nested lengths, said gasket being comparatively narrow and having a centering flange extending from the outer periphery thereof.

2. A gasket comprising a series of lengths of comparatively stiff, resilient sheet metal substantially U-shape in section embracing one another with the lengths in nested relation, and soft, resilient packing material between said lengths and entirely enclosed thereby in the spaces between the nested lengths.

3. A gasket comprising a series of rings of comparatively stiff, resilient sheet metal substantially U-shape in section encircling one another with the rings in nested relation, and soft, resilient packing material between said rings and entirely enclosed thereby in the spaces between the nested rings, said gasket being comparatively narrow and having a centering flange extending from the outer periphery thereof.

4. A gasket comprising a series of rings of comparatively stiff, resilient sheet metal substantially U-shape in section encircling one another with the rings in nested relation, and soft, resilient packing material between said rings and entirely enclosed thereby in the spaces between the nested rings.

5. A gasket comprising a strip of comparatively stiff, resilient sheet metal of U-shape in section wound spirally upon itself with adjacent convolutions in nested relation, and soft, resilient packing material in the spaces between the convolutions and entirely enclosed by the metal of the strip, the ends of the strip being secured to adjacent convolutions.

ARCH H. KINZEL.